April 24, 1962 M. DAVIS 3,030,806
SEEBECK-PELTIER FLOWMETER
Filed June 8, 1959 2 Sheets-Sheet 1

INVENTOR
Merlin Davis
BY Arthur Vinograd
ATTORNEY

April 24, 1962 M. DAVIS 3,030,806
SEEBECK-PELTIER FLOWMETER
Filed June 8, 1959 2 Sheets-Sheet 2

INVENTOR
Merlin Davis
BY Arthur Vinograd
ATTORNEY

United States Patent Office 3,030,806
Patented Apr. 24, 1962

3,030,806
SEEBECK-PELTIER FLOWMETER
Merlin Davis, Washington, D.C., assignor to the United States of America as represented by the Secretary of Commerce
Filed June 8, 1959, Ser. No. 818,983
2 Claims. (Cl. 73—204)

The present invention relates to measuring devices capable of measuring physical manifestations which are a function of thermal diffusivity, such as fluid flow, pressure difference, composition and the like. In particular, the invention contemplates the measurement of physical variables such as fluid flow by utilizing the temperature-difference effects manifested in Seebeck-Peltier junctions in response to a change in physical conditions such as, for example, fluid flow.

In accordance with the principles of the present invention an A.C. signal, adaptable to stable, high gain tuned amplification is generated in a Seebeck thermocouple circuit consequent to heat cycles relative to ambient conditions induced in an A.C. energized adjacent Peltier effect junction by heat transfer of the flowing fluid. Temperature changes in the fluid medium are compensated by use of a reference junction. The output of the device may conveniently be made directly proportional to the rate of flow. The instrument of the present invention may be used in connection with both liquids and gaseous fluids. The device of the present invention has particular utility in connection with measurements where the physical restrictions offered by conventional instruments cannot be tolerated. Specifically, in connection with physiological research on living animals, the requirements for measuring blood flow or air intake in situ compels the use of transducers which occupy as small a volume as possible. The principles of the present invention permit construction of a transducer of such small size that it can be used intravenously for measuring blood flow. It will be understood, however, that the suggested utility of the device is not restricted since it will be clear from the following description that the principles of the present invention can be applied in connection with the measurement of any changes in physical condition which are functions of thermal diffusivity.

It is accordingly an immediate object of the present invention to provide a flow-measuring device which offers negligible restriction to the flow of the fluid medium being measured.

An additional object of this invention is to provide a fluid flow measuring device in which the heat-transfer effects of a flowing fluid medium is used in connection with a thermocouple to provide an output signal representation of the rate of fluid flow.

Another object of the invention is to provide a fluid flow measuring device in which the modulation of an alternating current in accordance with the rate of fluid flow enables signal amplification in a practicable manner.

Still another object of the invention is to provide a fluid flow measuring device which requires relatively small input power.

A further object of the invention is to provide a compact fluid flow measuring device which permits placing of the measuring instrument into close proximity with the particular fluid flow area being investigated.

In connection with the previous object, it is another object of the present invention to provide a simple and compact fluid flow measuring device which allows the use of a multiplicity of elements in a small area of the fluid flow thereby enabling determination of the cross sectional flow pattern.

Other uses and advantages of the invention will become apparent upon reference to the specification and drawings in which:

FIGS. 1, 2, and 3 are diagrammatic illustrations in which FIG. 3 illustrates in simplified form some of the principles underlying the present invention as compared with known principles as embodied in FIGS. 1 and 2;

Figure 1:
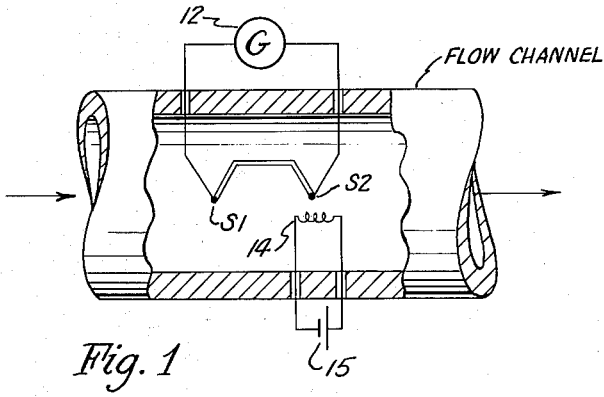

FIG. 1 illustrates a conventional flowmeter arrangement employing the thermocouple principle of operation. For example, a plurality of Seebeck thermocouples represented in FIG. 1 by S1 and S2 are placed in a fluid flow stream and some D.C. indicating means 12 such as a galvanometer is connected in circuit with the thermocouples. The double- and, single-line conductors shown in the various figures are indicative of the dissimilar metals or other materials employed to provide the Peltier coefficients and are not intended to represent the relative sizes of such elements. As is well known, any temperature difference at the junctions of a thermocouple will produce a current in a flow circuit including the junctions. The current flow is readily manifested by indicating device 12. By heating one of the thermocouples by means of a battery 15 and heating coil 14 as indicated in FIG. 1, the resulting temperature difference between thermocouples S1 and S2 will generate a current flow in the circuit including the indicating device 12.

It will also be apparent from FIG. 1 that the fluid flow represented by the arrows will have a cooling effect on the thermocouple and the temperature difference between thermocouples will accordingly vary with the rate of flow. The temperature difference being greatest for zero flow. Accordingly the indicating device 12 can conveniently be calibrated to indicate the rate of flow of the fluid in the flow channel.

Figure 2:
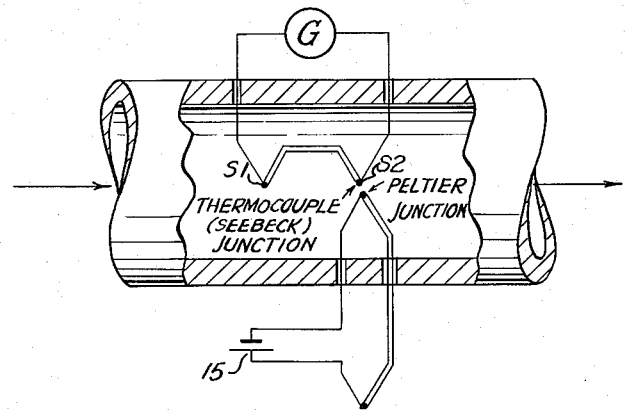

In FIG. 2 the heater element 14 shown in connection with FIG. 1 is replaced with a Peltier junction. The Peltier junction is similar in construction to the Seebeck thermocouple but is current-sensitive so that upon application of current through the circuit in the Peltier junction from source 15, one terminal of the Peltier junction will emit heat while the other will absorb heat depending on the polarity connection to battery source 15.

Figure 3:
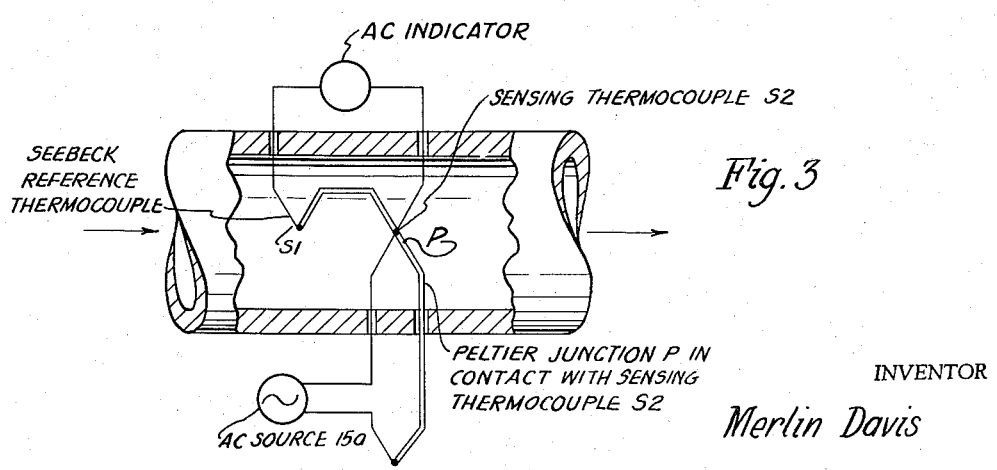

Such heating and cooling effect exhibited by the Peltier junction is employed in accordance with the principles of this invention as illustrated in FIG. 3 by using an alternating current source 15a in place of the battery source 15 shown in FIG. 2 for energizing the Peltier junction. Source 15a provides a relatively low-frequency power signal of approximately 10 to 1000 c.p.s. depending upon the available wire size employed in the junctions. For example, 0.001" diameter Chromel P and constantan wire are sufficiently strong to support themselves within a flowing stream and the thermal capacity of these wires, when used with a 10 c.p.s. signal, is sufficiently small to permit ordinary fluid flow measurements, e.g., of blood flow or breathing. By such arrangement if a low frequency alternating current is applied to the Peltier junction the latter will be alternately cooled and heated cyclically with source 15a and the temperature of the sensing thermocouple S2 will accordingly be made higher and lower as a function of time with respect to the reference thermocouple S1. It will be further noted from FIG. 3 that in one embodiment the Peltier junction is placed in contact with or may be formed integrally with the sensing thermocouple S2 in accordance with the principles of the present invention.

By virtue of such specific arrangement of Seebeck and Peltier junctions employed in the apparatus of the present invention, a modulated carrier signal will be generated in which the degree of modulation represents or is proportional to the rate of fluid flow passed the junctions.

Specifically, it will be clear from FIG. 3 that during one-half of the A.C. energization source cycle, the Peltier junction will be heated above ambient temperature and the flow of fluid passing the junctions P and S2 will result in a cooling effect. Similarly on the following half of the A.C. energization source cycle the junctions P and S2 will be cooler than ambient temperature and will therefore absorb heat from the fluid medium being measured. The temperature changes will produce a varying current flow on the Seebeck-thermocouple circuit and it will be clear that the amplitude of the signal in such circuit will be decreased due either to such heating or cooling by the fluid flow medium.

The output signal is therefore an alternating current signal which can conveniently be amplified by available, economical instruments. Because of the nature of the signal which permits such ease of amplification it will be apparent that the instrument is capable of accurately sensing even small changes in fluid flow.

Figure 4:
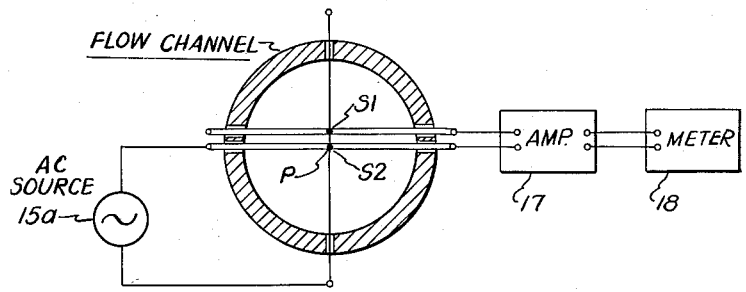
FIG. 4 is a view partly in section showing a practical implementation of the present invention.

FIG. 4 is a sectional view showing the present invention arranged to measure the flow of fluid in a channel. FIG. 4 shows the fluid flow channel in cross section. The Peltier junction P is shown connected to the A.C. energization source 15a. The previously referred-to circuit connecting the reference thermocouple S1 and the sensing thermocouple S2 is shown in FIG. 4 as including an alternating current amplifier 17 the output of which is connected to an indicating or measuring instrument 18. Preferably the amplifier 17 employed may be of a frequency discriminating, or tuned amplifier type. With RC input coupling, as is generally employed, the thermal fluctuation resulting from the A.C. source will result in one carrier due to $I^2R$ heating and another due to Peltier effects ($\pm PI$). The latter will have half the frequency of the former. These carriers can therefore readily be separated by using a frequency discriminating or tuned type of amplifier.

Figure 5:
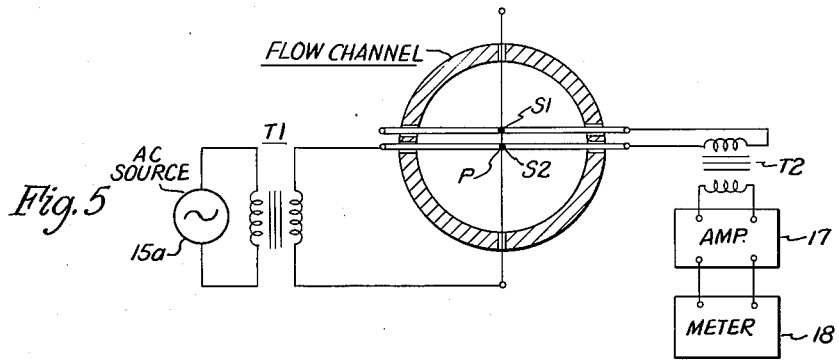
FIG. 5 is a view similar to FIG. 4 showing a modification of the present invention employing inductive coupling between the energizing source and the output, respectively.

FIG. 5 shows a modification of the invention of FIG. 4 in which both the A.C. energization source 15a and the amplifier for amplifying the rate of flow signal are inductively coupled to the Seebeck-Peltier junction circuits. Specifically, the A.C. energization source 15a shown in FIG. 5 is connected by a transformer T1 to the Peltier junction P while the output is obtained from the secondary of transformer T2 connected to the amplifier 17.

Figure 6:
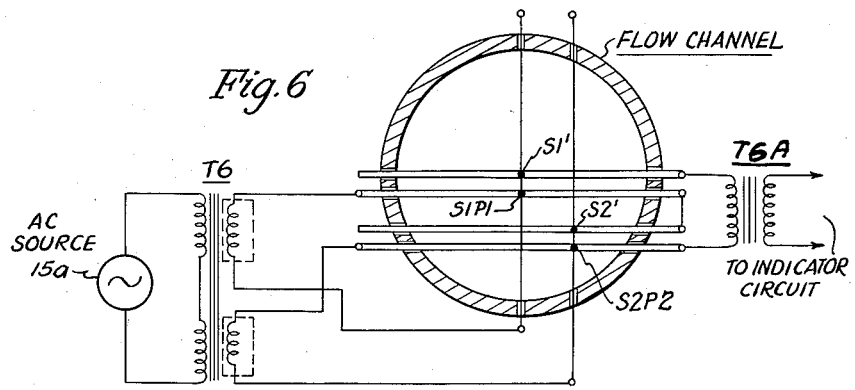
FIGS. 6 and 7 are further modifications of the present invention.
Figure 7:
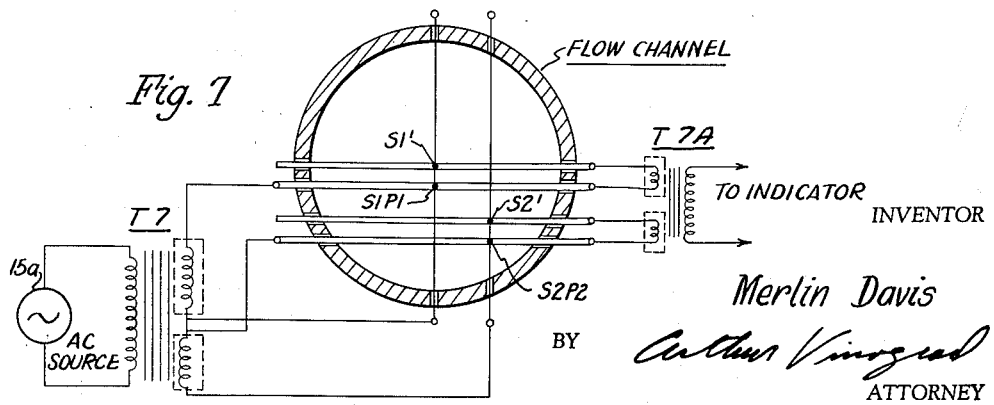

FIGS. 6 and 7 show further embodiments of the invention employed in a manner to obtain the cross-section or flow profile of the fluid medium. To accomplish such result a plurality of the Seebeck-Peltier transducers are mounted across the direction of fluid flow. The A.C. source 15a is coupled through a double-output transformer T6 or T7 so as to energize the plurality of junctions. Transformers T6a, T7a are provided to connect the output circuits to an indicator circuit of the type comprising the amplifier 17 and meter 18 shown in FIG. 5.

It will be apparent that the embodiments shown are only exemplary and that various modifications can be made in construction and arrangement within the scope of invention as defined in the appended claims.

What is claimed is:
1. An instrument for the detection and measurement of Peltier effect thermal amplitude modulations comprising at least one sensing and one reference Seebeck junction, at least one pair of Peltier junctions, said sensing Seebeck junction being thermally coupled to a respective one of said Peltier junctions and said reference Seebeck junction being positioned to absorb negligible heat from said Peltier junctions, a source of A.C. current connected in series with said pair of Peltier junctions, a frequency selective circuit connected between said sensing and reference Seebeck junction, and a utilization device connected to said frequency selective circuit.

2. An instrument for the detection and measurement of Peltier effect thermal amplitude modulation comprising a plurality of sensing Seebeck junctions, a plurality of reference Seebeck junctions, each connected to a respective one of said sensing Seebeck junctions, each of said sensing Seebeck junctions being thermally coupled to a respective one of said Peltier junctions and each reference Seebeck junction being positioned to absorb negligible heat from said Peltier junctions, a plurality of A.C. current sources, each connected in series with a respective one of said pairs of Peltier junctions, a frequency selective circuit connected between said sensing and reference Seebeck junctions, and a utilization device connected to said frequency selective circuit.

References Cited in the file of this patent
UNITED STATES PATENTS

| | | |
|---|---|---|
| 413,136 | Dewey | Oct. 15, 1889 |
| 2,314,877 | Hall | Mar. 30, 1943 |
| 2,525,197 | Beams et al. | Oct. 10, 1950 |
| 2,652,723 | Hastings | Sept. 22, 1953 |